US009137696B2

(12) United States Patent
Watanabe

(10) Patent No.: US 9,137,696 B2
(45) Date of Patent: Sep. 15, 2015

(54) COMMUNICATION QUALITY MEASUREMENT METHOD, RADIO BASE STATION AND MOBILE TERMINAL, AND RADIO COMMUNICATION SYSTEM

(75) Inventor: Naotoshi Watanabe, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 320 days.

(21) Appl. No.: 13/598,964

(22) Filed: Aug. 30, 2012

(65) Prior Publication Data
US 2012/0329507 A1 Dec. 27, 2012

Related U.S. Application Data

(63) Continuation of application No. PCT/JP2010/054175, filed on Mar. 12, 2010.

(51) Int. Cl.
*H04W 40/00* (2009.01)
*H04B 7/00* (2006.01)
*H04W 24/10* (2009.01)

(52) U.S. Cl.
CPC ..................... *H04W 24/10* (2013.01)

(58) Field of Classification Search
CPC .. H04W 24/10; H04W 72/085; H04B 1/1027; H04B 17/318
USPC ........................ 455/436, 437, 446, 456.1, 517
See application file for complete search history.

(56) References Cited

U.S. PATENT DOCUMENTS

| 6,438,375 | B1 | 8/2002 | Muller | |
|---|---|---|---|---|
| 7,072,655 | B2 * | 7/2006 | Ikeda et al. | 455/436 |
| 7,248,876 | B2 * | 7/2007 | Hirvonen | 455/446 |
| 8,526,961 | B2 * | 9/2013 | Sanders et al. | 455/446 |

FOREIGN PATENT DOCUMENTS

| JP | 2002-135826 | | 5/2002 |
|---|---|---|---|
| JP | 2002135826 | A * | 5/2002 |
| JP | 2002-271833 | | 9/2002 |
| JP | 2002-538744 | | 11/2002 |
| JP | 2008-306240 | | 12/2008 |
| JP | 2008306240 | A * | 12/2008 |

OTHER PUBLICATIONS

International Search Report dated May 25, 2010, from corresponding International Application No. PCT/JP2010/054175.
3GPP TR 36.902 V1.2.0 3rd Generation Partnership Project; Technical Specification Group Radio Access Network; Evolved Universal Terrestrial Radio Access Network (E-UTRAN); Self-configuring and self-optimizing network use cases and solutions (Release 9), May 2009.

(Continued)

*Primary Examiner* — Quochien B Vuong
(74) *Attorney, Agent, or Firm* — Katten Muchin Rosenman LLP

(57) ABSTRACT

Identification information which identifies a specific area zone that is part of a cell of a radio base station is transmitted from the radio base station to a mobile terminal. Subsequently, when the mobile terminal is located at the area zone specified by the identification information, communication quality between the mobile terminal and the radio base station is measured by the mobile terminal, and the quality information indicating the measured communication quality is transmitted from the mobile terminal to the radio base station.

5 Claims, 14 Drawing Sheets

(56) References Cited

OTHER PUBLICATIONS

3GPP TS 36.305 V9.0.0 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9), Sep. 2009.

Japanese Office Action dated Oct. 29, 2013, from corresponding Japanese Application No. 2012-504242.

* cited by examiner

FIG. 9

RRC connection reconfiguration message

```
rrc-TransactionIdentifier
criticalExtensions        CHOICE {
        c1                CHOICE{
        rrcConnectionReconfiguration-r8
                >measConfig
                >mobilityControlInfo
                ...
        defective area location notification control IE {
                hash calculation key;
                bit data effective range;
                information request location list (ID#1, ID#2, ... , ID#K)
                }
        spares
        },
        criticalExtensionsFuture
}
```

FIG. 10

<BROADCAST INFORMATION>

```
SystemInformation ::=            SEQUENCE{
  criticalExtensions             CHOICE{
  systemInformation-r8
    sib-TypeAndInfo SERQUENCE(SIZE(1..maxSIB)) OF CHOICE{
    sib2 SystemInformationBlockType2,
    sib3 SystemInformationBlockType2,
    ....
      }
  nonCriticalExtension SEQUENCE{
        information request location list (ID#1, ID#2, . . . , ID#K)
    }
  }
  criticalExtensionsFuture       SEQUENCE{}
  }
}
```

FIG. 11

<PAGING INFORMATION>

```
pagingRecordListg ::=    SEQUENCE[
  >PagingRecord ::=      SEQUENCE[
        ue-Identity      PagingUE-Identity,
        cn-Domain        ...
  }
  >PagingRecord ::=      SEQUENCE[
        ue-Identity      PagingUE-Identity,
        cn-Domain        ...
  }
  >PagingRecord ::=      SEQUENCE[
        information request location list (ID#1, ID#2, ..., ID#K)
        cn-Domain        ...
  }
  ...
systemInfoModification
etws-Indication
nonCriticalExtension
}
```

COMMUNICATION QUALITY MEASUREMENT METHOD, RADIO BASE STATION AND MOBILE TERMINAL, AND RADIO COMMUNICATION SYSTEM

CROSS-REFERENCE TO RELATED APPLICATION

This application is a continuation application of International Application PCT/JP2010/054175 filed on Mar. 12, 2010 and designated the U.S., the entire contents of which are incorporated herein by reference.

FIELD

The embodiment discussed herein relates to a communication quality measurement method, a radio base station and a mobile terminal, and a radio communication system.

BACKGROUND

In the field of radio communication systems including mobile phone systems and the like, it is known that environmental effects (e.g., reflection of radio waves by buildings, etc., and consequent radio wave interference) around a mobile terminal cause a defective area in which a radio communication service is not available, even within a coverage area (e.g., cell or sector) of a radio base station. Furthermore, especially in urban areas, construction of new buildings changes a surrounding environment around mobile terminals, which may cause a situation that an area to which the radio communication service was previously reachable turns into a new defective area. For this reason, from view points of configuration management, performance optimization, and automation of troubleshooting of a system based on a self-optimizing network (SON) on which much attention has been recently focused, it is preferable the location of a defective area is recognized by a radio base station.

As one example of approaches for a radio base station to recognize a defective area location, it is contemplated, for example, that when an increase in the occurrences of radio link disconnection on a cell level is detected or when an unusual load condition is detected, the action of detecting and locating a defective area is carried out, through investigation of communication quality conditions at some points within a cell, based on radio communication quality measured by mobile terminals (a measurement result in a so-called Measurement Report). Alternatively, it is also contemplated that detection of a defective area and recognition (identification) of the location of the defective area are carried out on a regular basis, through investigation of communication quality condition at some points within a cell based on radio communication quality measured by mobile terminals. Please see, for example, the following documents: Japanese Laid-open Patent Publication No. 2002-271833; 3GPP TS36.305 "*Evolved Universal Terrestrial Radio Access Network (E-UTRAN); Stage 2 functional specification of User Equipment (UE) positioning in E-UTRAN*"; and 3GPP TR36.902 version1.2.0 "*Evolved Universal Terrestrial Radio Access Network (E-UTRAN); Self-configuring and self-optimizing network (SON) use cases and solutions*".

In order to perform the aforementioned approaches, a radio base station may have to cause a mobile terminal located at a specific point within a cell to measure and report communication quality. Thus, the radio base station may have to recognize the respective individual locations of a number of mobile terminals within a cell. Furthermore, the radio base station may also have to issue an instruction to selectively cause some mobile terminal located at a specific point to perform measurement and report of communication quality. However, a commonly-available communication quality measurement and report operation (Measurement Report) for mobile terminals has no mechanism to selectively cause a mobile terminal located at a specific point to measure and report communication quality. For this reason, the radio base station may have to recognize the individual locations of a number of mobile terminals by use of a so-called "location tracking service" or the like for a purpose other than originally intended (i.e., enabling parents to know the location of their children having a mobile phone). In this case, however, the radio base station may have to perform operations for the location tracking service with respect to every mobile terminal within its own cell. This could cause the technical problem that a processing load considerably increases. This may in turn cause an increase of processing load in the radio communication system. As a result, the technical problem that the whole radio communication system goes into a state of congestion could be caused.

SUMMARY

According to one aspect of the embodiment, there is provided a method for use in a radio communication system including a mobile terminal and a radio base station, to measure communication quality at least at a specific area zone within a cell of the radio base station. The method includes: transmitting, by the radio base station, identification information identifying the area zone to the mobile terminal; measuring, by the mobile terminal, communication quality between the mobile terminal and the radio base station when the mobile terminal is located in the area zone identified by the identification information; and transmitting, by the mobile terminal, quality information indicating the measured communication quality to the radio base station when the mobile terminal is located in the area zone identified by the identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a data structure diagram illustrating a specific message portion within the RRC message;

FIG. 10 is a data structure diagram illustrating a specific message portion within the broadcast information;

FIG. 11 is a data structure diagram illustrating a specific message portion within the paging information;

DESCRIPTION OF EMBODIMENTS

An embodiment will now be described with reference to the accompanying drawings.

(1) General Configuration of Wireless Communication System

Figure 1:
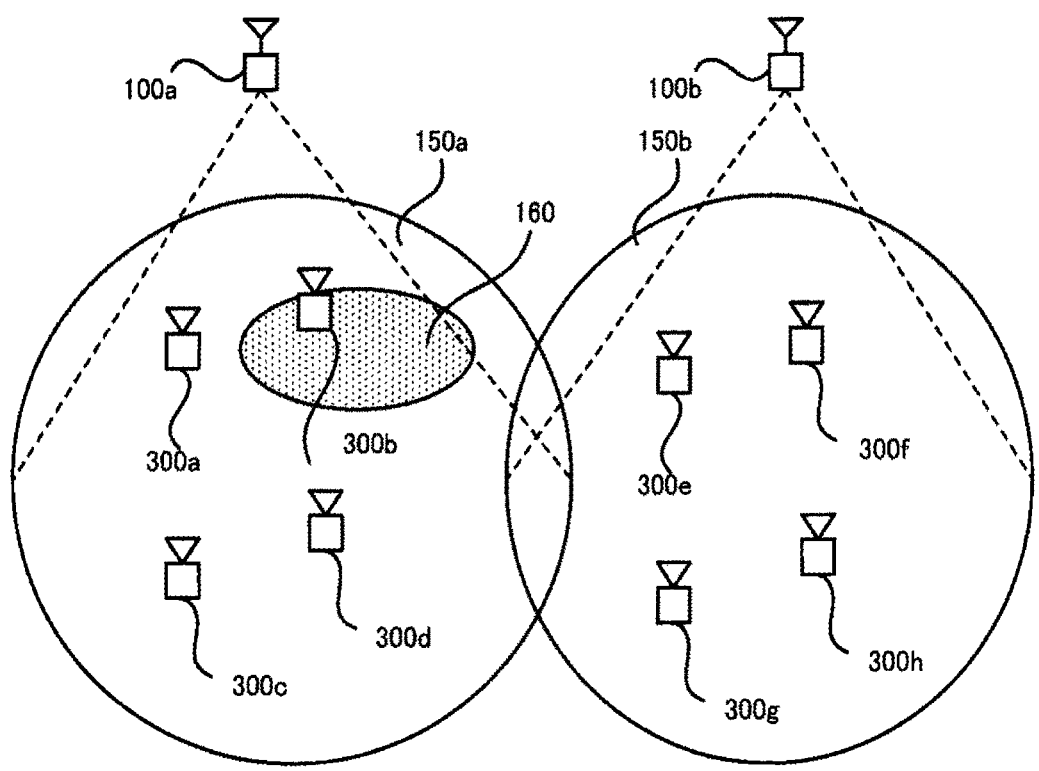
FIG. 1 is a block diagram illustrating an example of a basic configuration of a radio communication system according to one embodiment.

FIG. 1 is a block diagram illustrating one example of a general configuration of the radio communication system 1 according to the embodiment.

As illustrated in FIG. 1, the radio communication system 1 according to the embodiment includes an evolved NodeB (eNB) 100a, an eNB 100b, a user equipment (UE) 300a, a UE 300b, a UE 300c, a UE 300d, a UE 300e, a UE 300f, UE 300g, and a UE 300h. The number of eNBs 100 and the number of UEs 300 illustrated in FIG. 1 are merely exemplary, and not limited to those illustrated in FIG. 1. The eNB 100a and eNB 100b are collectively referred to as "eNBs 100" where appropriate. Similarly, the UEs 300a to 300h are collectively referred to as "UEs 300" where appropriate. Furthermore, the cells 150a and 150b are collectively referred to as "cells 150" where appropriate.

The eNBs 100 are radio base stations which cover their respective cells 150 whose radius is about several kilometers to ten and several kilometers or several ten kilometers. For example, in the example illustrated in FIG. 1, the eNB 100a is a radio base station which covers a cell 150a, while the eNB 100b is a radio base station which covers a cell 150b. Each eNB 100 performs radio communications with UEs 300 located within a cell 150 that the eNB 100 itself covers. In other words, the eNB 100 establishes communication connections with UEs 300 located in its own cell 150, and transmits and receives data to and from the UEs 300. The cells 150 covered by the respective eNBs 100 may be arranged so as to partly or wholly overlap with each other, or may be completely separated.

In the description above, an eNB 100 which covers a cell 150 whose radius is about several kilometers to ten and several kilometers or several ten kilometers (so-called a macro cell) is described by way of example. However, in addition to or in place of the eNB 100, a radio base station which covers a cell whose radius is about several hundred meters to 1 km (so-called micro cell) and a radio base station which covers a cell whose radius is about several meters to ten and several meters or several ten meters (so-called, femto cell), may be provided in the radio communication system 1. Furthermore, various radio base stations which cover a cell with a radius other than those described above may be also provided in the radio communication system 1. FIG. 1 illustrates an example in which one cell 150 is assigned to one eNB 100. However, a plurality of cells 150 (or sectors) may be assigned to one eNB 100.

The UE 300 is a mobile terminal that establishes a communication connection with a radio base station 100 associated with a cell 150 in which the UE 300 itself is located and that transmits and receives data to and from the radio base station 100. The UE 300 has two distinct modes as to whether or not a communication channel with the eNB 100 is currently being established. In the following description on this embodiment, a UE 300 which has a currently established communication channel with the eNB 100 is referred to as a "UE 300 in Connected Mode". Furthermore, a UE 300 which has no currently established communication channel with the eNB 100 is referred to as a "UE 300 in Idle Mode". Examples of UEs 300 include, but are not limited to, mobile phones and various information terminals having radio communication facility (e.g., PDAs, small personal computers, notebook personal computers, desktop personal computers). The UE 300 can use various radio communication services, including mail service, voice communication service, WEB browsing service, and packet communication service, via the eNB 100 and, in turn, via a core network (not illustrated) or the like which is disposed at a hierarchical level higher than the eNB 100.

Within a cell 150 described above, a defective area 160 in which a radio communication service is not available may occur depending on a surrounding environment around the UEs 300 (in other words, an environment within the cell 150). For example, an area where radio waves from the eNB 100 are difficult to reach because they are blocked by structures such as buildings or the like within the cell 150 may become a defective area 160. If a UE 300 is located in such a defective area 160, no radio communication service is available for the UE 300.

In this embodiment, a UE 300 that is located at a specific area zone within the cell 150 measures communication quality and transmits the measured communication quality to the eNB 100, so that the eNB 100 is able to recognize a defective area 160. Thus, the eNB 100 is able to determine whether the specific area zone is currently defective, and in turn, can properly recognize the location of a defective area (dead zone) 160. This makes it possible to take measures to remove the defective area 160 (and solve a service trouble). In the following, description will be given on an operation of measuring communication quality by an UE 300 located at a specific area zone within a cell 150, and an operation of transmitting a measured communication quality to the eNB 100 by the UE 300.

Here, one example of the radio communication system 1 is a radio communication system which is compliant with Long Term Evolution (LTE) or Evolved Universal Terrestrial Radio Access Network (E-UTRAN). However, the radio communication system 1 may be compliant with any specifications other than LTE and E-UTRAN.

(2) Block Diagrams

Figure 2:
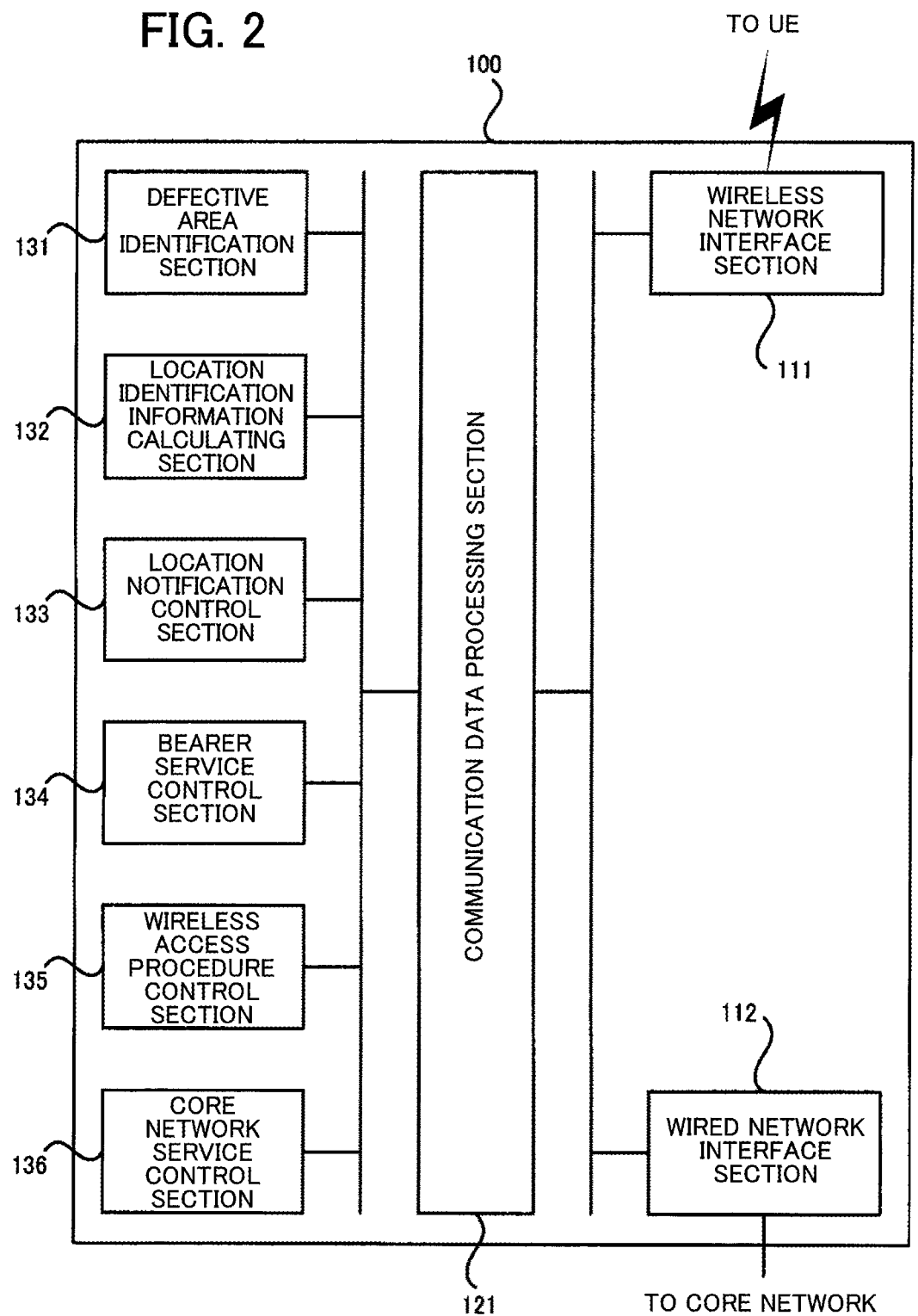
FIG. 2 is a block diagram illustrating one example of a configuration of an eNB included in the radio communication system.
Figure 3:
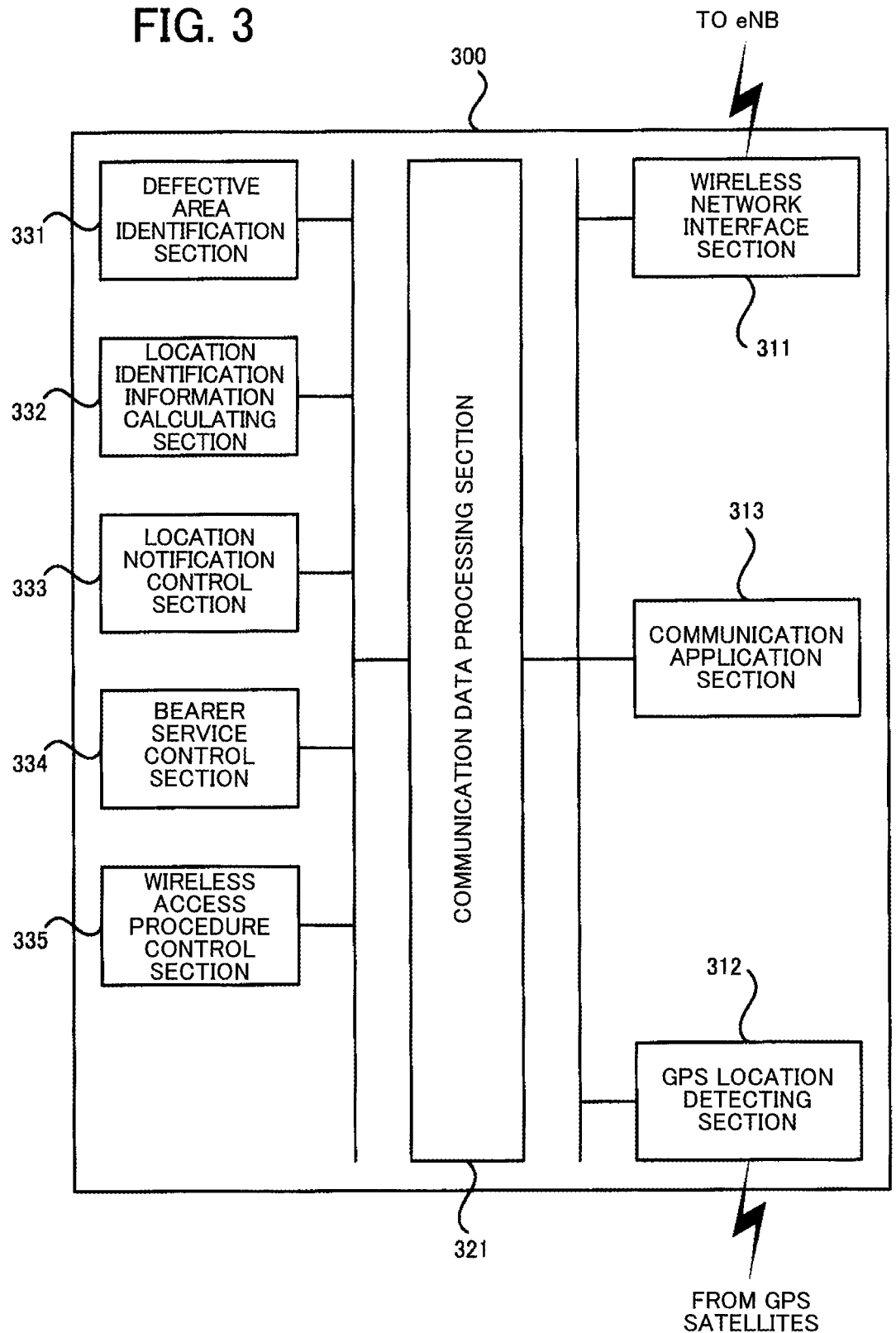
FIG. 3 is a block diagram illustrating one example of a configuration of a UE included in the radio communication system.

The following sections describe configuration examples of the eNB 100 and UE 300, included in the radio communication system 1, with reference to FIGS. 2 and 3.

(2-1) Block Diagram of eNB

FIG. 2 is a block diagram illustrating one example of the configuration of the eNB 100 of the radio communication system 1.

As illustrated in FIG. 2, the eNB 100 includes a radio network interface section 111, a wired network interface section 112, a communication data processing section 121, a defective area identification section 131, a location identification information calculating section 132, a location notification control section 133, a bearer service control section 134, a radio access procedure control section 135, and a core network service control section 136.

The radio network interface section 111 terminates L1/L2 protocols to be complied with when performing communications (e.g., data transmission and reception using radio communications) with UEs 300.

The wired network interface section 112 terminates L1/L2 protocols to be complied with when performing communications (e.g., data transmission and reception using wired communications) with a core network (not illustrated). Devices belonging to the core network include, but are not limited to, a mobile management entity (MME), a system architecture evolution gateway (SAE gateway, SAE-GW), and the like.

The communication data processing section 121 performs data transfer (or routing) based on communication channel configuration information (bearer control information) that is set by the bearer service control section 134, and performs various processes relating to data transfer protocols. Furthermore, the communication data processing section 121 recognizes signaling information such as radio access procedure messages or the like, and exchanges such signaling information with other sections within the eNB 100.

The defective area identification section 131 manages the cell 150 covered by the eNB 100 as a cell coverage area management map described later. In addition, the defective area identification section 131 also manages a defective area 160 using an address (ID) on a cell coverage area management map as described later. The location identification information calculating section 132 calculates location identification information that corresponds to an address (ID) on a cell coverage area management map from geographic location information such as latitude, longitude, and the like, according to a predetermined calculation rule. Preferably, the location identification information is that obtained by subjecting the geographic location information to arithmetic processing or conversion processing based on a predetermined calculation rule. One example of the location identification information is a hash value that is obtained by hashing the geographic location information based on a predetermined hash calculation key. Thus, mapping between an address (ID) on a cell coverage area management map and specific location identification information (e.g., a hash value) is performed. Furthermore, it is preferable that the location identification information has information content less than that of the original geographic location information. For this reason, it is preferable that the location identification information is calculated by first truncating some most-significant bits and least-significant bits from bit data that represents the geographic location information, and then hashing the so-obtained specific bit data. In other words, it is preferable that the location identification information is obtained by hashing only a significant part of bit data which represents the geographic location information. The following description assumes that hash values are used as the location identification information.

First, the location notification control section 133 notifies the UEs 300 of calculation method information which indicates a calculation rule (e.g., a hash calculation key and bit data effective ranges) that is used when the location identification information calculating section 132 calculates location identification information (e.g., hash values). The location notification control section 133 also notifies the UEs 300 of location designation information (e.g., an information request location list described later) which indicates an area zone regarding which the location notification control section 133 desires to cause the UEs 300 to perform measurement and transmission of communication quality (Measurement Report).

The bearer service control section 134 manages bearer control information that defines operations of communication data processing section 121 by setting up and releasing communication channels. The bearer service control section 134 also manages conditions of communication channels (e.g., those regarding presence of a link trouble and the like).

The radio access procedure control section 135 terminates transmission and reception of signaling information with UEs 300. One example of the signaling information is random access channel (RACH) messages (random access procedure messages) that are transmitted and received using a RACH.

The core network service control section 136 terminates transmission and reception of signaling information with the core network, and sets up and releases communication channels other than communication channels (radio section) between UEs 300 and the eNB 100.

(2-2) Block Diagram of UE

FIG. 3 is a block diagram illustrating one example of the UE 300 of the radio communication system 1.

As illustrated in FIG. 3, the UE 300 includes a radio network interface section 311, a global positioning system (GPS) location detecting section 312, a communication application section 313, a communication data processing section 321, a defective area geographic location recording section 331, a location identification information calculating section 332, a location notification control section 333, a bearer service control section 334, and a radio access procedure control section 335.

The radio network interface section 311 terminates L1/L2 protocols to be complied with when performing communications (e.g., data transmission and reception using radio communications) with the eNB 100.

The GPS location detecting section 312 receives GPS waves transmitted from GPS satellites, thereby obtaining geographic location information which indicates the location of the UE 300 using latitude and longitude.

The communication application section 313 causes an application (e.g., voice communication application, packet communication application, mail application, and WEB browsing application) used by a user of the UE 300 to run. The communication application section 313 is specified as the source or destination for data communications with peer UEs 300.

The communication data processing section 321 performs data transfer (or routing) based on communication channel configuration information (bearer control information) that is set by the bearer service control section 334, and performs various processes relating to data transfer protocols. Furthermore, the communication data processing section 321 recognizes signaling information such as radio access procedure messages, and exchanges such signaling information with other sections within the UE 300.

The defective area geographic location recording section 331 obtains geographic location information from the GPS location detecting section 312 when, for example, the UE 300 is located at an area zone indicated by location designation information (e.g., an information request location list described later). In other words, the defective area geographic location recording section 331 obtains and records the geographic location information that represents the current location of the UE 300.

The location identification information calculating section 332 calculates location identification information (e.g., a hash value) that corresponds to an address (ID) on a cell coverage area management map from the geographic location information recorded by the defective area geographic location recording section 331, based on a calculation rule (e.g., a hash calculation key and bit data effective ranges) that is indicated by the calculation method information transmitted from the location notification control section 133 of the eNB 100.

The location notification control section 333 manages the calculation method information transmitted from the location notification control section 133 of the eNB 100. The location notification control section 333 also manages the location designation information (e.g., an information request location list or the like) transmitted from the location notification control section 133 of the eNB 100.

The bearer service control section 334 manages bearer control information that defines operations of the communication data processing section 321 by setting up and releasing communication channels. The bearer service control section 334 also manages conditions of communication channels (e.g., those regarding presence of a link trouble and the like). Furthermore, the bearer service control section 334 also controls and manages measurement and transmission of communication quality (Measurement Report) between the eNB 100 and the UE 300 described above.

The radio access procedure control section 335 terminates transmission and reception of the signaling information with the eNB 100. One example of the signaling information is a RACH message (a random access procedure message) that is transmitted and received using a RACH.

(3) Details of Operations

In the following, description will be given on one example of an operation flow of the radio communication system 1 according to the embodiment with reference to FIGS. 4 to 14.

(3-1) General Operation

Figure 4:
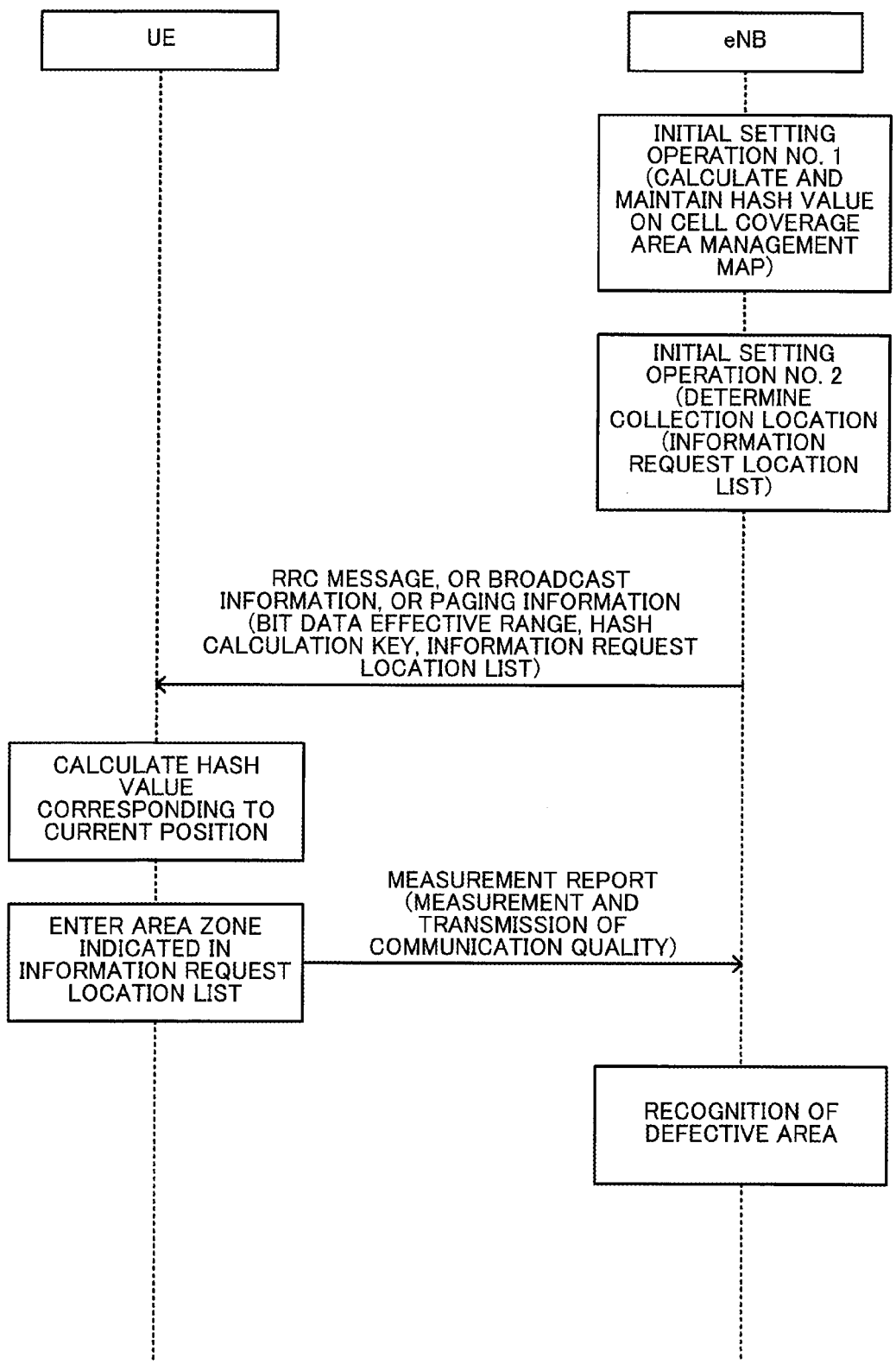
FIG. 4 is a sequence diagram schematically illustrating a flow of operations in the radio communication system according to the embodiment as a whole.

First, a general operation flow of the radio communication system 1 according to the embodiment will be described briefly with reference to FIG. 4. FIG. 4 is a sequence diagram schematically illustrating a flow of operations of the radio communication system 1 according to the embodiment as a whole. As illustrated in FIG. 4, the eNB 100 first performs an initial setting operation. Examples of the initial setting operation include, but not limited to, generating a cell coverage area management map that is used for management of the cell 150 covered by the eNB 100, and generating calculation method information that represents a calculation rule (e.g., a hash calculation key or a bit data effective range) for converting geographic location information (e.g., latitude and longitude) to location identification information (e.g., a hash value).

In addition, the eNB 100 generates location designation information (e.g., an information request location list described later) as part of the initial setting operation. In other words, the eNB 100 selects an area zone regarding which the eNB 100 desires to cause the UE 300 to perform measurement and transmission of communication quality (Measurement Report). The location designation information may contain a hash value corresponding to the area zone regarding which the eNB 100 desires to cause the UE 300 to perform measurement and transmission of radio quality, may contain geographic location information of the subject area zone, or may contain arbitrary information from which the subject area zone can be uniquely identified. Furthermore, the area zone indicated by the location designation information is preferably an area zone that is suspected to have been a defective area 160 or that is predicted to be a defective area 160 in the near future. Examples of such area zones include, but not limited to, an area zone in which the number of occurrences of radio link disconnection increases, and an area zone at which a significant communication load change (e.g., significant decrease) is detected.

Subsequently, the eNB 100 transmits the calculation method information (e.g., a hash calculation key and bit data effective ranges) that is set by the initial setting operation, and the location designation information (e.g., an information request location list) to the UEs 300. For this purpose, the eNB 100 may use radio resource configuration (RRC) messages. In particular, the eNB 100 may use messages for controlling the communication quality measuring and transmitting operation (i.e., Measurement Report) of the UEs 300 among the RRC messages. Alternatively, the eNB 100 may use broadcast information to transmit the calculation method information and the location designation information to all the UEs 300 that are located within its own cell 150. As used herein, the term "broadcast information" is to be understood in its broad sense, meaning information that is broadcast to all the UEs 300 located within the cell 150. One example of broadcast information is messages that are transmitted using a broadcast channel (BCH). Alternatively, the eNB 100 may use paging information to transmit the calculation method information and the location designation information to all the UEs 300 located its own cell 150. As used herein, the term "paging information" is to be understood in its broad sense, meaning information for calling some specific UEs 300 located within the cell 150. One example of paging information is messages that are transmitted using a paging channel (PCH).

Then, each UE 300 obtains its geographic location information (i.e., information representing the current location of the UE 300 itself) detected by the GPS location detecting section 312. After that, the UEs 300 each calculate location identification information (e.g., a hash value) from the obtained geographic location information, based on the calculation method information that is transmitted from the eNB 100 using an RRC message, broadcast information, or paging information. Subsequently, each UE 300 determines whether or not its own location represented by the calculated hash value corresponds to one of the area zones (e.g., coincides with a hash value designating an area zone) represented by the location designation information that is transmitted from the eNB 100 using an RRC message, the broadcast information, or paging information. If the location represented by the calculated hash value corresponds to the area zone represented by the location designation information, the broadcast information, or the paging information, then the UE 300 performs measurement and transmission of communication quality at the area zone.

Alternatively, the UEs 300 may perform the above operation without using hash values. Specifically, each UE 300 obtains its own geographic location information detected by the GPS location detecting section 312. Subsequently, if the obtained geographic location information corresponds to one of the area zones represented by the location designation information that is transmitted from the eNB 100, then, the UE 300 performs measurement and transmission of communication quality at the area zone.

In this way, the eNB 100 detects an actual communication quality at a desired area zone within the cell 150. In other words, the eNB 100 is thus allowed to detect an actual communication quality at an area zone that is suspected to have been a defective area 160 or that is predicted to be a defective area 160 in the near future, within the cell 150. As a result, the eNB 100 properly recognizes whether or not a defective area 160 occurs based on the communication quality so detected.

Having described the operation flow, details of the respective operations will be further described below. Specifically, the description will be given in the following sequence: (i) description on the initial setting operation by the eNB 100 with reference to FIGS. 5 to 7, (ii) description on the transmission operation with reference to FIGS. 8 to 11, in which the RRC message, the broadcast information, and the paging information, are transmitted to the UEs 300 by the eNB 100, (iii) description on the reception operation with reference to FIG. 12, in which the RRC message, the broadcast information, and the paging information, from the eNB 100 are received by the UEs 300, and (iv) description on the operation of measuring and transmitting communication quality by the UEs 300 with reference to FIGS. 13 and 14.

(3-2) Initial Setting Operation

Figure 5:
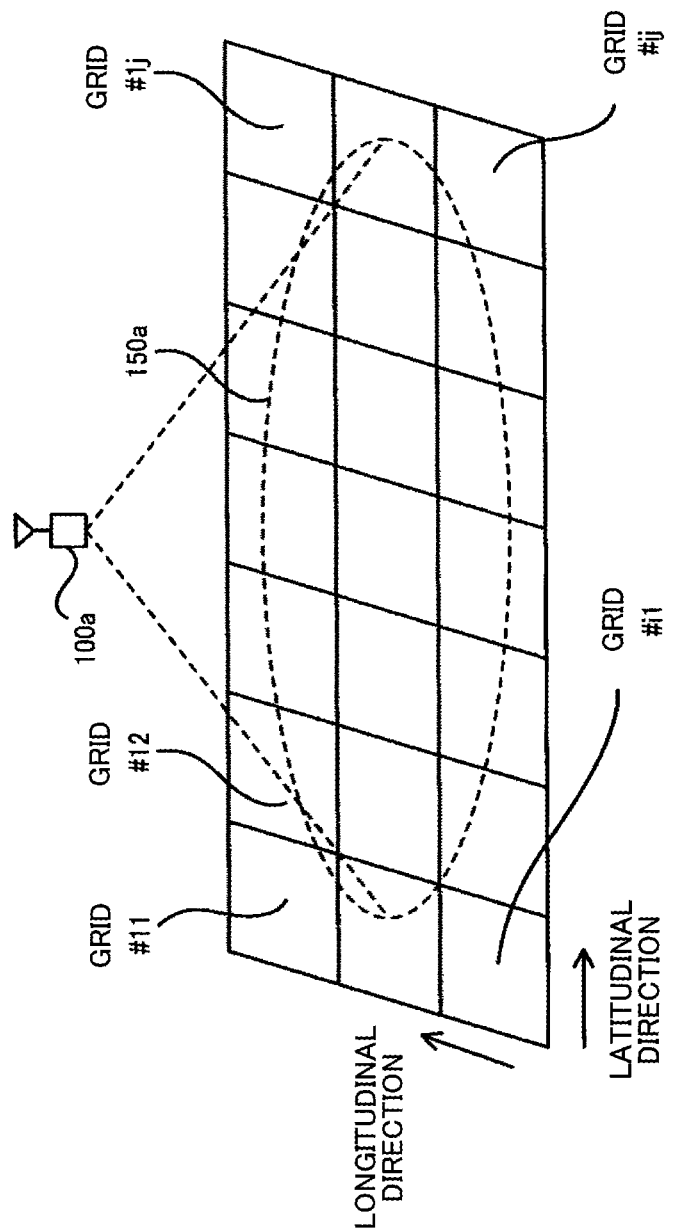
FIG. 5 is a schematic diagram illustrating a cell coverage area management map that is set during an initial setting operation.
Figure 6:
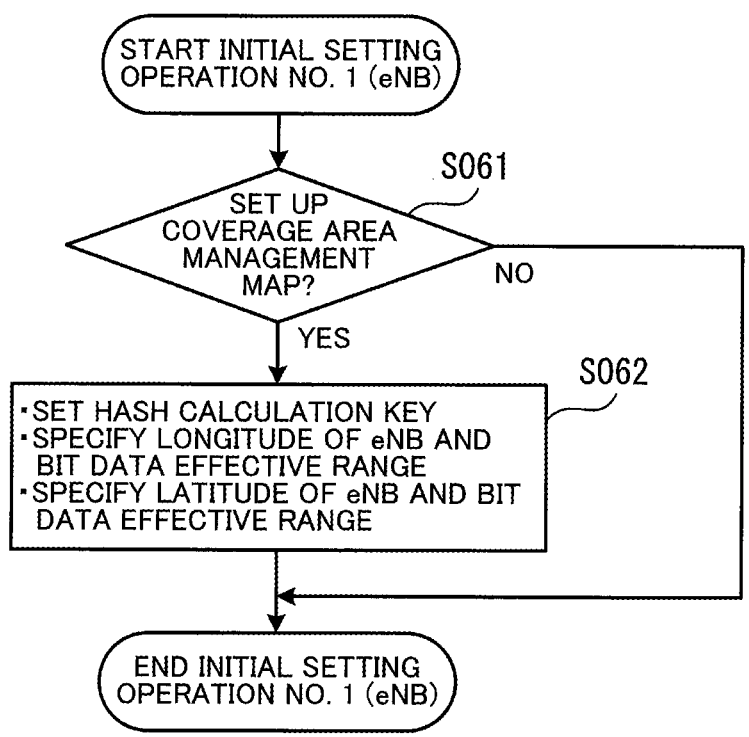
FIG. 6 is a flowchart illustrating part of a flow of the initial setting operation by the eNB.
Figure 7A:
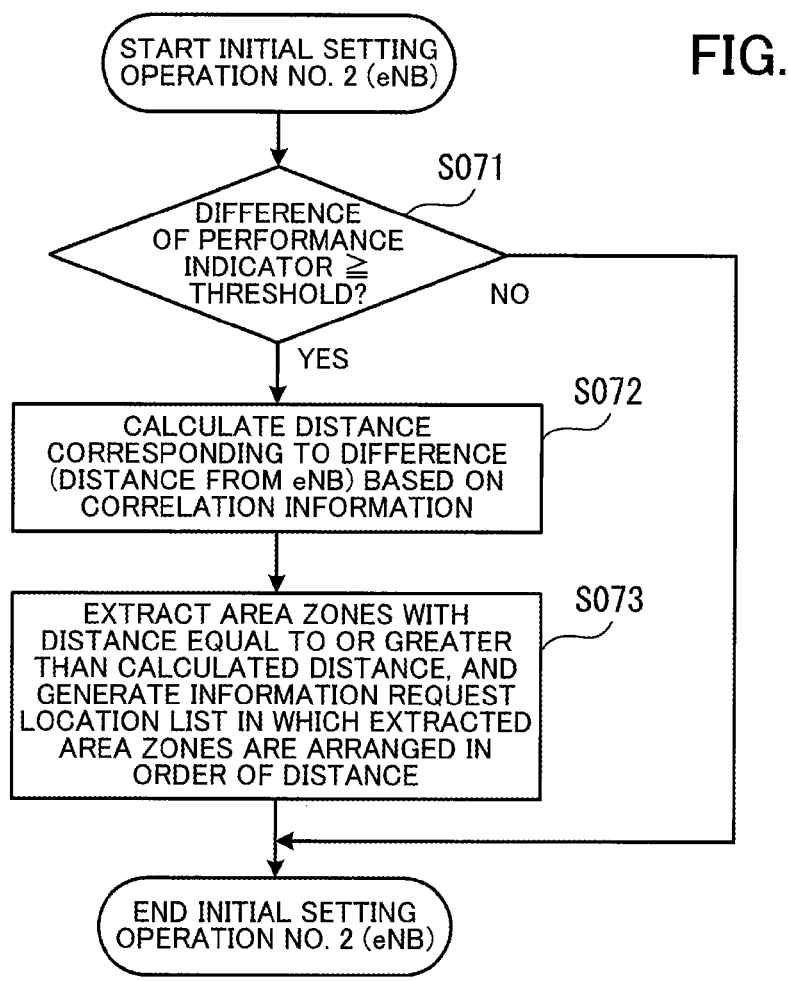
FIG. 7A is a flowchart illustrating another part of the flow of the initial setting operation by the eNB.
Figure 7B:
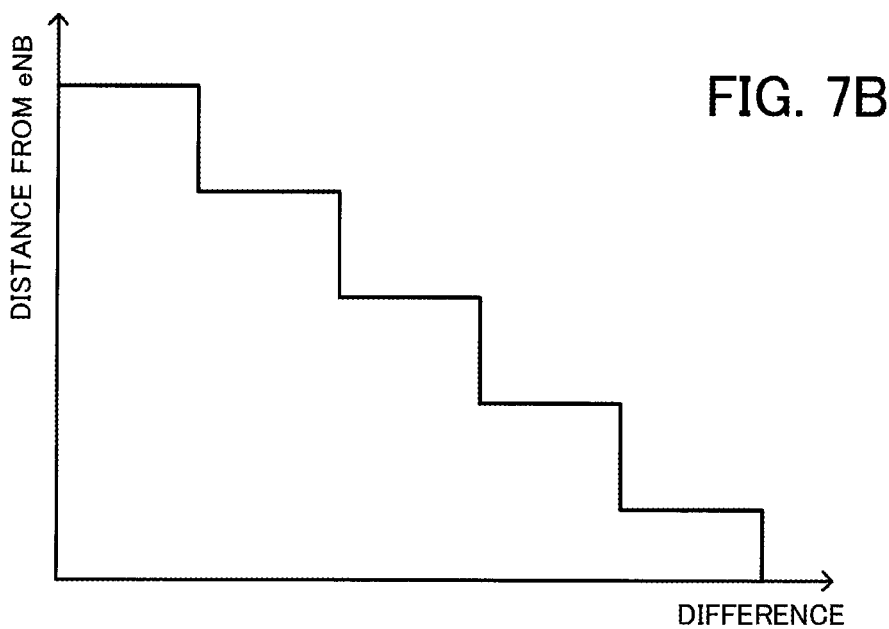
FIG. 7B is a graph illustrating a distance from the eNB that corresponds to a difference between a measurement value of a predetermined performance indicator and a target value for the performance indicator.

This section describes the initial setting operation by the eNB 100 with reference to FIG. 5 to FIGS. 7A and 7B. Specifically, FIG. 5 is a schematic diagram illustrating a cell coverage area management map that is set during the initial setting operation, FIG. 6 is a flowchart illustrating one part of a flow of an initial setting operation by the eNB 100, FIG. 7A is a flowchart illustrating another part of the some flow, and FIG. 7B is a graph illustrating a distance from the eNB 100 that corresponds to a difference between a measurement value of a predetermined performance indicator and a target value for this performance indicator.

As illustrated in FIG. 5, a cell coverage area management map set by the initial setting operation is divided into a plurality of grids which are arranged in the form of a matrix of i lines along a longitude direction by j columns along a latitude direction (where i and j are positive integers). This map is big enough to cover the cell 150. Furthermore, each grid has a grid ID assigned thereto which corresponds to a specific hash value (i.e., location identification information). Thus, a specific area zone within the cell 150 can be uniquely identified according to a hash value (i.e., a single grid ID) that is calculated from its geographic location information.

The cell coverage area management map illustrated in FIG. 5 is set by the initial setting operation illustrated in FIG. 6. As illustrated in FIG. 6, the defective area identification section 131 determines whether to set up a cell coverage area management map (step S061). This determination may be made previously by an operator of the eNB 100.

If it is determined in step S061 not to set up a cell coverage area management map (step S061: No), the eNB 100 terminates the operation. In this case, the eNB 100 may perform its default operations.

If it is determined in step S061 to set up a cell coverage area management map (step S061: Yes), the defective area identification section 131 sets a hash calculation key (step S062). Furthermore, the defective area identification section 131 specifies the latitude and longitude of the eNB 100, and also specifies a bit data effective range for each of the latitude and the longitude (step S062). For example, the defective area identification section 131 truncates some most-significant bits that are common to the entire cell 150 and some least-significant bits that fall below the granularity of the cell coverage area management map, from each of the longitude bit data and the latitude bit data. Then, the defective area identification section 131 specifies the so-obtained bit data portions as bit data effective ranges for latitude and longitude, respectively. More specifically, when the latitude of the cell 150 is represented by a value "40 degrees 20 minutes xx seconds North (xx may vary)", the digits corresponding to the common value "40 degrees 20 minutes" are discarded. Furthermore, when the latitudinal length of one grid of the cell coverage area management map is, for example, 100 m, the digits corresponding to the precision of less than 100 m are also discarded. The remaining digits are then specified as a bit data effective range for latitude. The preceding description also applies to a bit data effective range for longitude. Then, the eNB 100 generates location designation information (e.g., an information request location list or the like) according to the operating procedure illustrated in FIG. 7A. Specifically, as illustrated in FIG. 7A, a location notification control section 133 of the eNB 100 determines whether or not a difference between a measurement value of a predetermined performance indicator that is informed of from the UEs 300 on a regular basis or on a irregular basis and a target value for this predetermined performance indicator is equal to or greater than a predetermined threshold value (step S071). Examples of the performance indicator include average received signal strength, average signal-to-interference noise ratio, and average data throughput of the UEs 300 in the cell 150. Here, the target value of the performance indicator is experimentally, theoretically, mathematically, or statistically determined so that an appropriate radio communication service can be provided, taking into account installation environments for the cell 150 such as radio propagation characteristics and the like.

If it is determined in step S071 that the above difference is less than the predetermined threshold value (step S071: No), the eNB 100 may terminate the operation or may repeat step S071.

However, if it is determined in step S071 that the above difference is equal to or greater than the predetermined threshold value (step S071: Yes), the location notification control section 133 calculates a distance from the eNB 100 relative to the difference between a measurement value of a performance indicator and the target value for this performance indicator, based on correlation information which represents the relationship between a distance from the eNB 100 and a difference between a measurement value of a performance indicator and the target value for the performance indicator (step S072).

The correlation information is preferably provided, for example, as a graph illustrated in FIG. 7B (or provided as a mathematical expression or as a function), in advance. For example, the correlation information may be stored in advance in a memory or the like not illustrated on the eNB 100. Generally, it is known that the shorter the distance between the eNB 100 and UE 300, the better the received signal strength. This is also true for signal-to-interference noise ratio and data throughput. Therefore, if a greater difference of the performance indicator is found, it is highly possible that a communication failure (or disruption of radio communication service) is present somewhere closer to the eNB 100. For this reason, the correlation information in this embodiment has a negative correlation between the difference of a performance indicator and the distance from the eNB 100. It is of course that the correlation information illustrated in FIG. 7B is one example, and that correlation information which is different from that illustrated in FIG. 7B may be used.

Subsequently, the location notification control section 133 extracts area zones (for example, grid) within the cell 150 which correspond to the distance calculated at step S072, and more area zones within the cell 150 whose distance is greater than the calculated distance. (step S073). Furthermore, the location notification control section 133 also generates a list in which hash values (i.e., grid IDs) that identify the extracted area zones are arranged in the order of distance. This list is referred to as an information request location list (step S073).

(3-3) Operation of Transmitting RRC Message, Broadcast Information, and Paging Information, from eNB to UE In the following, description will be given on the operation of transmitting an RRC message, broadcast information, and paging information, from the eNB 100 to the UEs 300, with reference to FIG. 8 to FIG. 11. Specifically, FIG. 8 is a flowchart illustrating transmission of an RRC message, broadcast information, or paging information by the eNB 100, FIG. 9 is a data structure diagram illustrating a specific message portion within a RRC message, FIG. 10 is a data structure diagram illustrating a specific message portion of broadcast information, and FIG. 11 is a data structure diagram illustrating a specific message portion of paging information.

Figure 8:
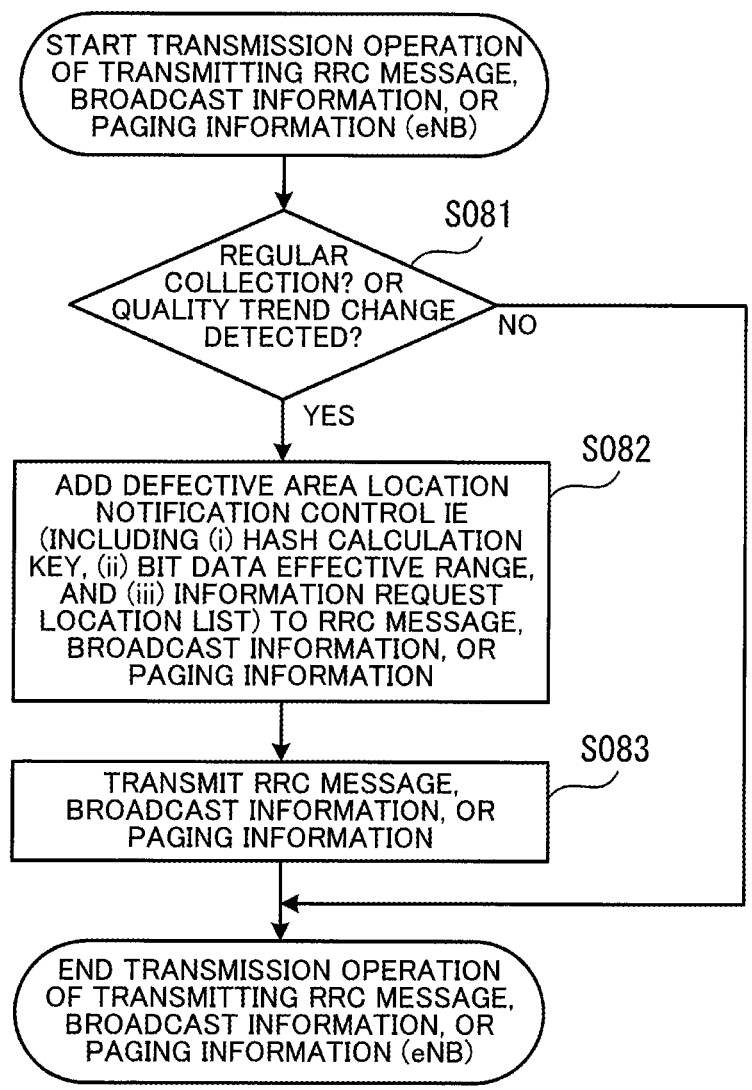
FIG. 8 is a flowchart illustrating a flow of a transmission operation of transmitting an RRC message, broadcast information, or paging information by the eNB.

As illustrated in FIG. 8, the location notification control section 133 of the eNB 100 determines whether it is the time for regular collection of communication quality (step S081). As used herein, the wording "time for regular collection" means "time for measurement of radio quality and transmission of a measurement result" when UEs 300 are configured to regularly perform such measurement and transmission (i.e., Measurement Report). In addition, the location notification control section 133 also determines whether there is any change in the trend of a performance indicator to be measured (step S081).

If it is determined in step S081 that it is not the time for regular collection of communication quality and that no change in the trend of the performance indicator is detected (step S081: No), the eNB 100 may terminate the operation or may repeat the step S081.

On the other hand, if it is determined in step S081 that it is the time for regular collection of communication quality or that a change in the trend of the performance indicator is detected (step S081: Yes), the location notification control section 133 adds a defective area location notification control IE including a hash calculation key, bit data effective ranges, and an information request location list, to the RRC message, broadcast information, or paging information, to be transmitted to UEs 300.

There are several options about where to insert the defective area location notification control IE in the above message or information. When, for example, an RRC message is used, the defective area location notification control IE may be placed in the criticalExtensions field, an extension field of the RRC message as seen in FIG. 9. Other data fields may also serve this purpose. In the case of broadcast information, the defective area location notification control IE may be placed in the nonCriticalExtension SEQUENCE field, an extension of the SystemInformation field as seen in FIG. 10. Other data fields may also serve this purpose. In the case of paging information, the defective area location notification control IE may be placed in a PagingRecord SEQUENCE field, as part of the PagingRecordListg field, as seen in FIG. 11. Other data fields may also serve this purpose.

When broadcast information or paging information is used, the above-noted fields may only carry the information request location list as seen in FIGS. 10 and 11, while also sending an RRC message to deliver the hash calculation key and bit data effective ranges. This configuration is to maintain the confidentiality of hash calculation keys, taking into account that broadcast information and paging information are transmitted to all UEs 300 within the cell 150. Alternatively, the hash calculation key, the bit data effective range, and the information request location list may all be added to broadcast information or paging information.

Subsequently, the location notification control section 133 transmits the RRC message, broadcast information, or paging information to which the defective area location notification control IE is added at step S082, to the UEs 300 via the communication data processing section 121 and the radio network interface section 111 (step S083).

(3-4) Operation of Receiving RRC Message, Broadcast Information, or Paging Information, by UE 300.

Figure 12:
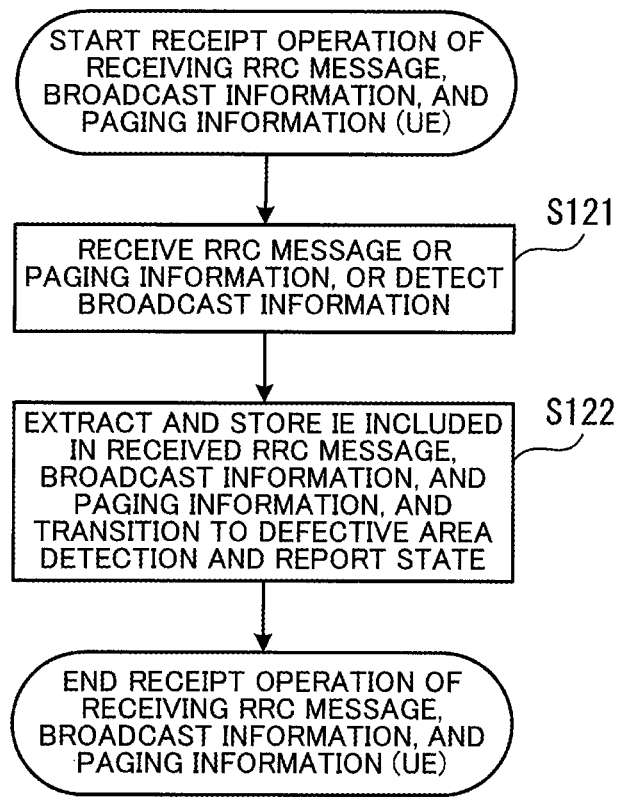
FIG. 12 is a flowchart illustrating a flow of a reception operation of receiving an RRC message, broadcast information, or paging information by a UE.

FIG. 12 is a flowchart illustrating a flow of an operation of receiving an RRC message, the broadcast information, or paging information, by the UE 300.

As illustrated in FIG. 12, the location notification control section 333 of the UEs 300 receives an RRC message, broadcast information, or paging information carrying defective area location notification control IE via the communication data processing section 321 and the radio network interface section 311 (step S121). UEs 300 in Connected Mode can receive RRC messages, broadcast information, and paging information, while UEs 300 in Idle Mode can receive broadcast information and paging information.

Subsequently, the location notification control section 333 extracts the defective area location notification control IE included in the received message or information and causes the hash calculation key, bit data effective range, and information request location list, indicated in this defective area location notification control IE, to be stored in a memory not illustrated or the like (step S122). After that, the UE 300 transitions to a defective area detection and report state, and performs measurement and transmission of communication quality as described below.

(3-5) Operation of Measuring and Transmitting Communication Quality by UE

Figure 13:
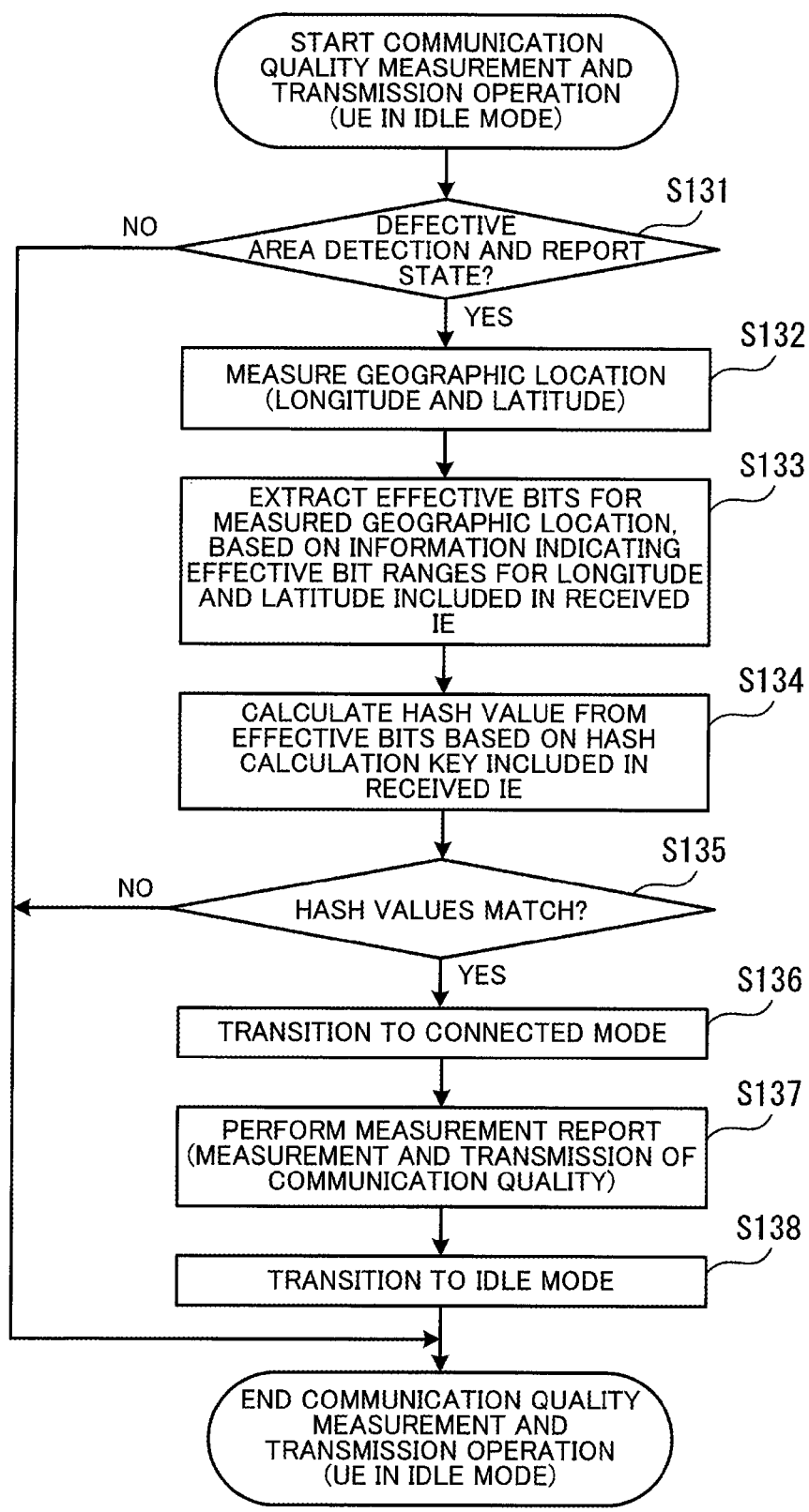
FIG. 13 is a flowchart illustrating a flow of a communication quality measurement and transmission operation by the UE in an Idle Mode.
Figure 14:
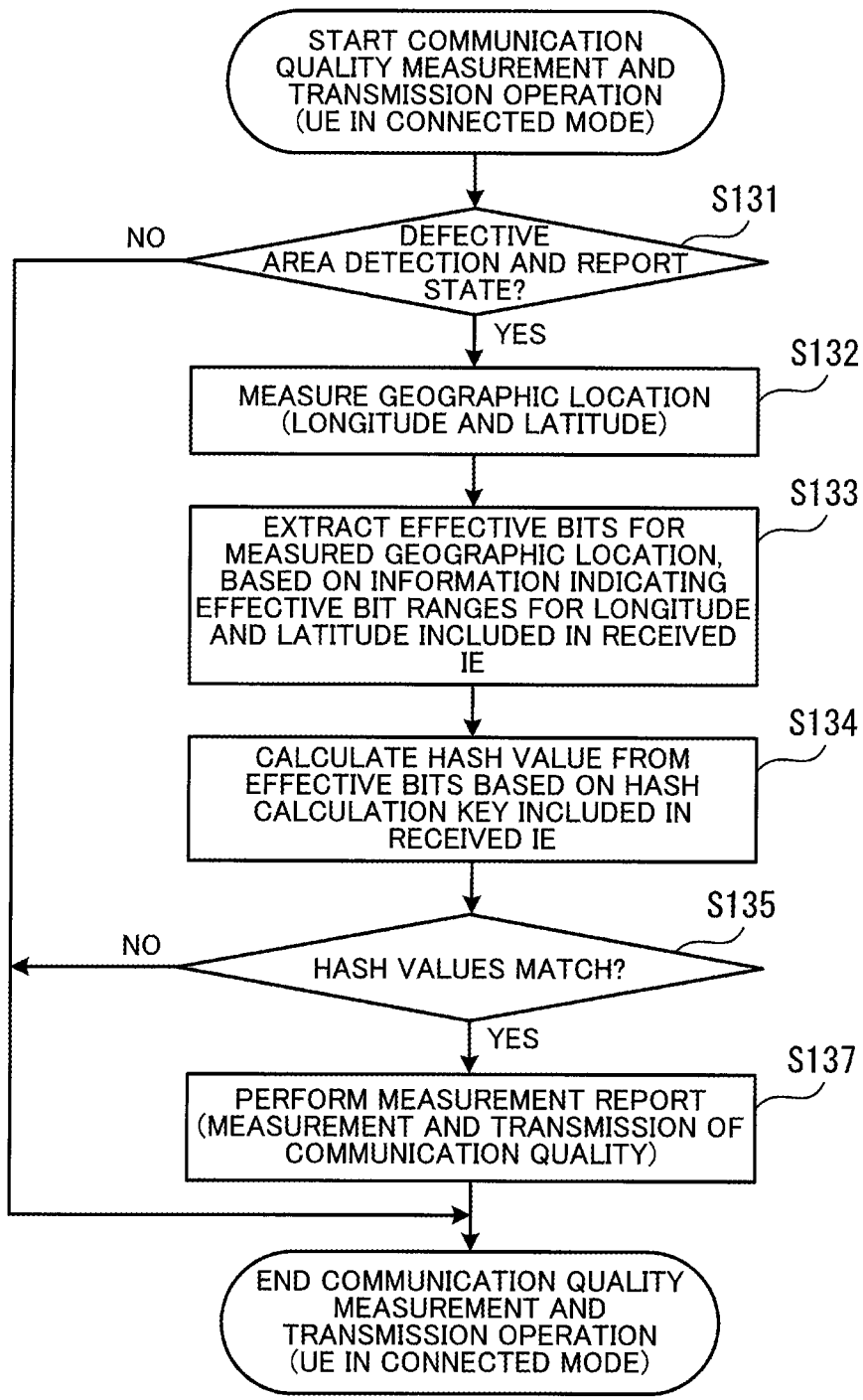
FIG. 14 is a flowchart illustrating a flow of a communication quality measurement and transmission operation by the UE in Connected Mode.

This section describes operation of measuring and transmitting radio quality by the UEs 300 with reference to FIG. 13 and FIG. 14. Specifically, FIG. 13 is a flowchart illustrating a flow of a communication quality measurement and transmission operation by a UE 300 in Idle Mode, and FIG. 14 is a flowchart illustrating a flow of a communication quality measurement and transmission operation by a UE 300 in Connected Mode.

The UE 300 in Idle Mode performs a communication quality measurement and transmission operation according to the flow illustrated in FIG. 13. Specifically, as illustrated in FIG. 13, the defective area geographic location recording section 331 determines whether or not the UE 300 itself is in a defective area detection and report state (step S131).

If it is determined in step S131 that the UE 300 itself is not in the defective area detection and report state (step S131: No), the UE 300 may terminate the operation or may repeat step S131.

On the other hand, if it is determined in step S131 that the UE 300 itself is in the defective area detection and report state (step S131: Yes), the defective area geographic location recording section 331 obtains geographic location information from the GPS location detecting section 312 (step S132). Subsequently, the defective area geographic location recording section 331 transfers the geographic location information so obtained to the location identification information calculating section 332.

Then, the location identification information calculating section 332 extracts a specific significant part of bit data which represents geographic location information, based on a bit data effective range contained in the defective area location notification control IE in the RRC message, broadcast information, or paging information that is received from the eNB 100 (step S133).

Subsequently, the location identification information calculating section 332 hashes the specific significant bit data extracted at step 133, using a hash key contained in the defective area location notification control IE in the received message (step S134). In this way, the location identification information calculating section 332 can calculate a hash value (i.e., a grid ID) that represents the current location of the UE 300.

Then, the location identification information calculating section 332 determines whether any of the hash values (grid IDs) indicated in the information request location list contained in the defective area location notification control IE matches the hash value (grid ID) calculated at step S134 (step S135).

If no match is found in step S135 (step S135: No), it is determined that the current location of the UE 300 is not in an area zone of which the eNB 100 desires measurement and transmission of communication quality (Measurement Report). Thus, the UE 300 may terminate the operation or may repeat the operating steps beginning with step S131.

On the other hand, if a match is found in step S135 (step S135: Yes), it is determined that the current location of the UE 300 is in the area zone of which the eNB 100 desires measurement and transmission of communication quality (Measurement Report). Thus, the bearer service control section 334 once brings the UE 300 into Connected Mode (step S136), and then performs measurement and transmission of communication quality (Measurement Report) (step S137). After completion of measurement and transmission of radio quality (Measurement Report), the bearer service control section 334 then brings the UE 300 back to Idle Mode (step S138).

Meanwhile, the UE 300 in Connected Mode performs the communication quality measurement and transmission operation according to the flow illustrated in FIG. 14. In contrast to the UE 300 in Idle Mode discussed above in FIG. 13, the UE 300 in Connected Mode performs measurement and transmission of communication quality (step S137) without going back and forth between Connected Mode and Idle Mode (as in step S136 and step S138 in FIG. 13).

As described above, in the radio communication system 1 according to this embodiment, an information request location list is transmitted from the eNB 100 to UEs 300. After that, when an UE 300 that has received the information request location list enters an area zone indicated in the list, the UE 300 selectively performs measurement and transmission of communication quality at this area zone. In this way, the eNB 100 obtains a measurement result of communication quality at a specific area zone within its own cell 150 without the need for recognizing the geographic locations of UEs 300 within the cell 150. As a result, processing load of the radio communication system 1 can be reduced by the amount corresponding to this recognition. This is advantageous over a conventional radio communication system in which the eNB recognizes the geographic locations of all the UEs within a cell and selectively issues an instruction to a specific UE located at a desired location to cause the specific UE to perform measurement and transmission of communication quality.

Furthermore, in the radio communication system according the embodiment, the eNB 100 is allowed to transmit an information request location list to UEs 300, using RRC messages, in particular, using a message for controlling a radio quality measurement and transmission operation (i.e., Measurement Report). Thus, UEs 300 in Connected Mode can each appropriately obtain the information request location list.

Furthermore, in the radio communication system 1 according the embodiment, the eNB 100 is also allowed to transmit an information request location list to UEs 300, using broadcast information. Thus, UEs 300 either in Connected Mode or Idle Mode can each appropriately obtain the information request location list.

Furthermore, in the radio communication system 1 according the embodiment, the eNB 100 is also allowed to transmit an information request location list to UEs 300, using paging information. Thus, UEs 300 either in Connected Mode or in Idle Mode can each appropriately obtain the information request location list.

Furthermore, when the information request location list is transmitted to the UE 300 using broadcast information or paging information, the eNB 100 can obtain the communication quality measurement result from UEs 300 in Idle Mode as well as from UEs 300 in Connected Mode. Thus, a larger number of measurements can be used to detect a defective area 160. As a result, the eNB 100 can more accurately determine occurrence and location of a defective area 160.

Furthermore, in the radio communication system according to the embodiment, the eNB 100 extracts specific area zones within the cell 150, depending on a difference between a measurement value of a performance indicator and a target value for the performance indicator. Thus, the eNB 100 can appropriately narrow down the area zones to be subjected to measurement and transmission of communication quality.

Furthermore, in the radio communication system of the embodiment, in place of geographic location information such as longitude, latitude and the like, a hash value that is calculated from such geographic location information is incorporated in location designation information (e.g., information request location list). As a result, the data size of the location designation information can be decreased. It goes without saying that the foregoing effects and advantages can be provided even when geographic location information such as longitude, latitude and the like is contained in the location designation information.

Furthermore, in the radio communication system 1 according to the embodiment, the UE 300 is notified of a hash calculation key to be used for calculating a hash value in advance from the eNB 100. Thus, the UEs 300 can each appropriately calculate a hash value from detected geographic location information.

Furthermore, the UE 300 is notified of a hash calculation key from the eNB 100 using a secure procedure (e.g., RRC messages) after the UE 300 is authenticated. Therefore, no malicious UEs 300 can obtain a hash calculation key. There is no chance for the eNB 100 to take improper hash values sent from a malicious UE as proper hash values. In view of such effect, it is preferable that a hash calculation key is transmitted using an RRC message, rather than using broadcast information or paging information.

Furthermore, in the radio communication system 1 according to the embodiment, a hash value can be calculated from a specific significant part/portion of bit data that represents geographic location information. As a result, compared with the case of calculating a hash value from the entire bit data, the data size of hash values can be reduced.

Furthermore, in the radio communication system 1 according to the embodiment, the eNB 100 notifies the UE 300 of information designating which portion of the bit data is significant in advance. Therefore, the UE 300 can appropriately extract the specific significant portion of the bit data which represents detected geographic location information, and can appropriately calculate a hash value from the extracted specific bit data.

According to the communication quality measurement method as described above, identification information identifying a specific area zone within a cell of a radio base station is transmitted from the radio base station to mobile terminals. Thus, it is possible to cause a mobile terminal located at an area zone indicated by the identification information to perform measurement and transmission of communication quality at the area zone. Therefore, the radio base station is able to detect communication quality at a desired area zone within a cell without recognizing the locations of mobile terminals within the cell. As a result, the processing load of the radio communication system can be relatively reduced.

The proposed radio communication system, radio base station, and mobile terminals, measurement method and their variations may provide all or some of the advantages described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A method for use in a radio communication system including a mobile terminal and a radio base station, to measure communication quality at least at a specific area zone within a cell of the radio base station, the method comprising:
   transmitting, by the radio base station, identification information identifying the area zone to the mobile terminal, the area zone being suspected to be a defective area which is not available to service radio communication for the mobile terminal;
   obtaining, by the mobile terminal, its geographic location;
   calculating, by the mobile terminal, a first hash value from the geographic location based on a hash calculation key transmitted from the radio base station;
   comparing, by the mobile terminal, the first hash value and a second hash value which coincides with the area zone identified by the identification information;
   measuring, by the mobile terminal, the communication quality at the area zone between the mobile terminal and the radio base station when the first hash value corresponds to the second hash value;
   transmitting, by the mobile terminal, quality information indicating the measured communication quality to the radio base station; and
   determining, by the radio base station, that the area zone is the defective area based on the received quality information;
   wherein the first hash value is calculated from a specific significant portion of bit data which represents the geographic location and the specific significant portion of bit data is notified of by the radio base station;
   wherein the identification information includes the hash calculation key, a bit data effective range for specifying latitude and longitude of the mobile terminal, and a list in which the second hash values that identify the area zones are arranged in an order of distance,
   wherein when the radio base station has an established communication connection with the mobile terminal, the radio base station transmits the identification information to the mobile terminal using RRC (Radio Resource Configuration) messages, or transmits the hash calculation key and the bit data effective range using RRC messages and transmits the list using broadcast information or paging information,
   and wherein when the radio base station has no established communication connections with the mobile terminal, the radio base station transmits the identification information to the mobile terminal using broadcast information or paging information.

2. The method according to claim 1, wherein the radio base station determines that the area zone is the defective area based on correlation information in the quality information which represents a relationship of distance from the radio base station to the mobile station relative to a difference between a measurement value of the communication quality and a target value for the communication quality.

3. The method according to claim 1, further comprising:
   transmitting, by the mobile terminal, a measurement value of a performance indicator to the radio base station;
   determining, by the radio base station, whether or not a difference between the measurement value informed from the mobile terminal and a target value is equal to or greater than a predetermined threshold value;
   calculating, by the radio base station, a distance of the radio base station to the mobile station relative to the difference when the difference is equal to or greater than the predetermined threshold value;
   extracting, by the radio base station, the area zones within the cell which correspond to the distance calculated; and
   transmitting, by the radio base station, the identification information identifying the extracted area zone to the mobile terminal.

4. A radio base station comprising:
   a transmitter configured to transmit identification information identifying at least a specific area zone within a cell to a mobile terminal, the area zone being suspected to be a defective area which is not available to service radio communication for the mobile terminal; and
   a receiver configured to receive quality information representing communication quality at the area zone between the mobile terminal and the radio base station and determine that the area zone is the defective area based on the quality information, the quality information being transmitted from the mobile terminal located within the area zone identified by the identification information;
   wherein:
   the mobile terminal calculates a first hash value from a geographic location of the mobile terminal based on a hash calculation key transmitted from the radio base station,
     compares the first hash value and a second hash value which coincides with the area zone identified by the identification information,
     measures the communication quality when the first hash value corresponds to the second hash value, and
     transmits the quality information indicating the measured communication quality to the radio base station;
   wherein the first hash value is calculated from a specific significant portion of bit data which represents the geographic location and the specific significant portion of bit data is notified of by the radio base station;
   wherein the identification information includes the hash calculation key, a bit data effective range for specifying latitude and longitude of the mobile terminal, and a list in which the second hash values that identify the area zones are arranged in an order of distance,
   wherein when the radio base station has an established communication connection with the mobile terminal, the radio base station transmits the identification information to the mobile terminal using RRC (Radio Resource Configuration) messages, or transmits the hash calculation key and the bit data effective range using RRC messages and transmits the list using broadcast information or paging information, and wherein when the radio base station has no established communication connections with the mobile terminal, the radio base station transmits the identification information to the mobile terminal using broadcast information or paging information.

5. A radio communication system comprising a mobile terminal and a radio base station, wherein:

the radio base station includes:
- a first transmitter configured to transmit identification information identifying at least a specific area zone within a cell to the mobile terminal, the area zone being suspected to be a defective area which is not available to service radio communication for the mobile terminal; and
- a receiver configured to receive quality information representing communication quality at the area zone between the mobile terminal and the radio base station and determine that the area zone is the defective area based on the quality information, the quality information being transmitted from the mobile terminal located within the area zone identified by the identification information;

the mobile terminal includes:
- a calculator configured to calculate a first hash value from a geographic location of the mobile terminal based on a hash calculation key transmitted from the radio base station;
- a comparator configured to compare the first hash value and a second hash value which coincides with the area zone identified by the identification information;
- a measurement unit configured to measure the communication quality when the first hash value corresponds to the second hash value, and
- a second transmitter configured to transmit the quality information indicating the measured communication quality to the radio base station;

wherein the first hash value is calculated from a specific significant portion of bit data which represents the geographic location and the specific significant portion of bit data is notified of by the radio base station;

wherein the identification information includes the hash calculation key, a bit data effective range for specifying latitude and longitude of the mobile terminal, and a list in which the second hash values that identify the area zones are arranged in an order of distance, wherein when the radio base station has an established communication connection with the mobile terminal, the radio base station transmits the identification information to the mobile terminal using RRC (Radio Resource Configuration) messages, or transmits the hash calculation key and the bit data effective range using RRC messages and transmits the list using broadcast information or paging information, and wherein when the radio base station has no established communication connections with the mobile terminal, the radio base station transmits the identification information to the mobile terminal using broadcast information or paging information.

* * * * *